United States Patent
Williams (10) Patent No.: US 9,500,552 B2
(45) Date of Patent: Nov. 22, 2016

(54) METHOD FOR CALIBRATING AND MANUFACTURING A FORCE-SENSING TOUCH SCREEN PANEL

(71) Applicant: MOTOROLA SOLUTIONS, INC, Schaumburg, IL (US)

(72) Inventor: William R. Williams, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 387 days.

(21) Appl. No.: 14/285,172

(22) Filed: May 22, 2014

(65) Prior Publication Data

US 2015/0338303 A1    Nov. 26, 2015

(51) Int. Cl.
    *G01L 25/00* (2006.01)
    *G06F 3/041* (2006.01)

(52) U.S. Cl.
    CPC .............. *G01L 25/00* (2013.01); *G06F 3/0414* (2013.01); *G06F 3/0418* (2013.01); *G06F 2203/04103* (2013.01)

(58) Field of Classification Search
    None
    See application file for complete search history.

(56) References Cited

U.S. PATENT DOCUMENTS

| | | | |
|---|---|---|---|
| 5,515,040 A | 5/1996 | Lee et al. | |
| 6,977,646 B1 | 12/2005 | Hauck et al. | |
| 7,158,122 B2 * | 1/2007 | Roberts | 345/173 |
| 8,363,020 B2 * | 1/2013 | Li et al. | 345/173 |
| 8,963,874 B2 * | 2/2015 | Li et al. | 345/174 |
| 2001/0033274 A1 * | 10/2001 | Ong | 345/173 |
| 2005/0244263 A1 | 11/2005 | Hardt et al. | |
| 2007/0115019 A1 | 5/2007 | Bonaccio et al. | |
| 2007/0247444 A1 * | 10/2007 | Yeh | 345/174 |
| 2012/0038577 A1 | 2/2012 | Brown et al. | |
| 2012/0319987 A1 | 12/2012 | Woo | |

FOREIGN PATENT DOCUMENTS

| | | |
|---|---|---|
| EP | 0421025 A1 | 4/1991 |
| GB | 2290917 A | 1/1996 |
| WO | 20020069124 A1 | 9/2002 |
| WO | 0243375 A2 | 5/2005 |
| WO | 20120018504 A1 | 2/2012 |

* cited by examiner

*Primary Examiner* — Robert R Raevis
(74) *Attorney, Agent, or Firm* — Scott. M. Garrett; Barbara R. Doutre (57) ABSTRACT

A method and apparatus for calibrating a force sensing touch screen panel includes determining calibration factors for the position sensing layers of the touch screen panel, and applying those calibration factors to adjust nominal resistance values for resistance components of the position sensing layers when force is applied to the touch screen panel. The calibration factors result in a more accurate determination of the resistance of a force sensing layer which changes resistance as a function of force applied to the touch screen panel. The resistance of the force sensing layer can be used to determine the force applied based on a curve relating force to resistance.

20 Claims, 7 Drawing Sheets

METHOD FOR CALIBRATING AND MANUFACTURING A FORCE-SENSING TOUCH SCREEN PANEL

FIELD OF THE DISCLOSURE

The present disclosure relates generally to touch screen displays, and more particularly to touch screen displays that allow sensing of touch force.

BACKGROUND

Touch screen displays for computing devices have recently become quite popular, especially for small, portable devices such as mobile cellular telephone devices. The touch screen allows a user to interact with displayed content as well as to enter input without the need of conventional computing input devices such as, for example, a keyboard or mouse. As a result, there has been much attention given to the design and use of touch screen displays.

One area of interest that can broaden the user experience of using a touch screen display is force sensing. Force sensing determines not only where on the screen the user is touching, but also the force being used by the user in interacting with the touch screen display. The amount of force used can be used by the device to modify content being displayed on the touch screen display in correspondence with the amount of force.

In a conventional touch screen, for example, location of a touch can be sensed based on electrical changes (i.e. capacitive, resistive). The magnitude of the change, so long as it exceeds some threshold, is of less, if any, concern. Force sensing, however, requires a determination of the amount of change. Given that transparent conductor material used in touch screens, such as, for example, indium tin oxide, is typically sputter deposited, there is an inherent and significant tolerance variation in the process. The process variations can result in substantially different electrical properties from unit to unit, which affects the determination of the magnitude of force applied to the touch screen.

Accordingly, there is a need for a method to account for process variations in force-sensing touch screen panels so that a similar user experience occurs from unit to unit despite such variations.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Well known elements, structure, or processes that would be necessary to practice the invention, and that would be well known to those of skill in the art, are not necessarily shown and should be assumed to be present unless otherwise indicated.

DETAILED DESCRIPTION

Embodiments include a method of calibrating a touch screen panel which includes measuring an electrical resistance of a upper calibration trace of an upper position sensing layer of the touch screen panel, and measuring an electrical resistance of a lower calibration trace of a lower position sensing layer of the touch screen panel. The method also includes determining an upper calibration factor as a ratio of the measured electrical resistance of the upper calibration trace to a nominal upper resistance, and determining a lower calibration factor as a ratio of the measured electrical resistance of the lower calibration trace to a nominal lower resistance. The method further includes determining a total resistance through a point at which a force is applied on the touch screen panel, the total resistance including an upper layer component, a lower layer component, and a force sensing layer component. The force sensing layer component is a resistance of a compressible material between the upper and lower layers. The method further includes determining an electrical resistance of the force sensing layer component by subtracting a corrected upper layer component and a corrected lower layer component from the total resistance. The corrected upper layer component and corrected lower layer components are produced by applying the upper calibration factor and lower calibration factor to the upper layer component and lower layer component, respectively. The method further includes determining the force applied on the touch screen panel by mapping the electrical resistance of the force sensing layer to the force applied on a curve of force sensing layer resistance over force.

Figure 1:
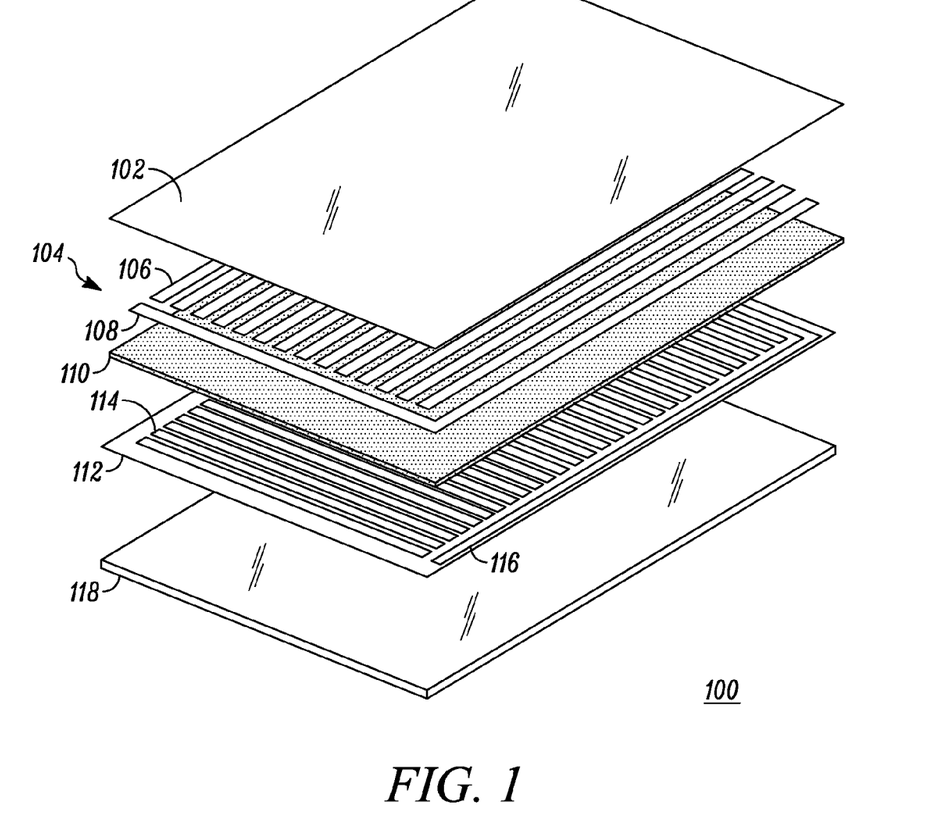
FIG. 1 is an exploded view of a force sensing touch screen panel in accordance with some embodiments.

FIG. 1 is an exploded view of a force sensing touch screen panel 100 in accordance with some embodiments. The force sensing touch screen panel 100 is a stack of transparent layers which are assembled together and placed over, or in front of a graphical display such as a light emitting diode (LED) display. The touch screen panel 100 allows a user to see content displayed on the graphical display, and interact with content by touching the touch screen panel. Both the position of touch and the force of the touch can be sensed using the force sensing touch screen panel 100, and used to modify, adjust, or otherwise interact with the content displayed on the graphical display. Since touch force is one input used for interaction with the device in which the graphical display is mounted, it is important to have an accurate touch input, or at least a consistent force response from unit to unit in production.

Starting from the top, or what would be the outermost layer with which the user will make physical contact, is a transparent cover layer 102 which can be made of, for example, polyethylene terephthalate (PET), and is an electrical insulator that is flexible. An upper position sensing layer 104 can be disposed on the back or lower surface of the transparent cover layer, but is shown here in free space for clarity. The upper position sensing layer includes a plurality of transparent conductor traces or runners 106 which can be made of, for example, indium tin oxide (ITO). Also provided in the upper position sensing layer 104 is a calibration trace 108 that is used to calibrate resistance measurements of positions along the transparent conductor 106. Typically the transparent conductor material for the upper position sensing layer is disposed on the back surface of the transparent cover layer 102 in a thin layer by, for example, sputter deposition. The resistance of the conductor material is directly dependent on the thickness of the transparent conductor material, and can have significant variation on the order of ±30%. The calibration trace 108 is used to determine an upper calibration factor. A nominal resistance value for calibration traces can be determined, for example, by measuring the actual resistance of the calibration traces of a number of units and averaging them. The calibration factor can be determined by comparing the actual resistance of the calibration trace 108 for each particular unit to the determined nominal value. Likewise, each transparent conductor 106 has a substantially similar length and width, and therefore each transparent conductor 106 has a substantially equivalent electrical resistance from one end to an opposite end. Thus, the actual resistance of each transparent conductor 106, as well as a partial resistance at any point along the transparent conductor 106, can be determined by applying the upper calibration factor to a nominal resistance value for the transparent conductors 106.

Below the upper position sensing layer 104 is the force sensing layer 110 which is made of very small particles of transparent conductor material (e.g. ITO) that is suspended in a transparent matrix material. The combination is a compressible material that exhibits an electrical resistance from top to bottom that decreases as it is compressed. The force sensing layer can be in contact with the upper position sensing layer 104 and the bottom position sensing layer, which is comprised of transparent conductors 114. The lower transparent conductors 114 are oriented orthogonally to the upper transparent conductors 106. A lower conductor trace 116 allow calibration of the lower transparent conductors 114 in the same way that upper calibration trance 108 does for the upper position sensing layer 104. The transparent conductors 114 and the lower calibration trace 116 are disposed on a lower transparent substrate 112, which can be further disposed on a transparent stiffener 118. The transparent stiffener 118 can be, for example, glass, and provides relatively inflexible surface against which the transparent cover layer 102 can be flexed by application of force (in the downward direction as shown), and force sensing layer can be compressed or otherwise decreased in thickness between the upper transparent conductors 106 and the lower transparent conductors 114.

It will be appreciated by those skilled in the art that additional conventional elements, which are not shown, are necessary to operation of the force sensing touch screen panel 100. Those elements can include, for example, connectors that connect each transparent conductor 106, 114 to a sensing circuit. Various spacers, adhesives, and other conventional elements are also used to join and retain the various layers together. The layers can be retained in a touch screen panel housing in correspondence with the graphical display.

Figure 2:
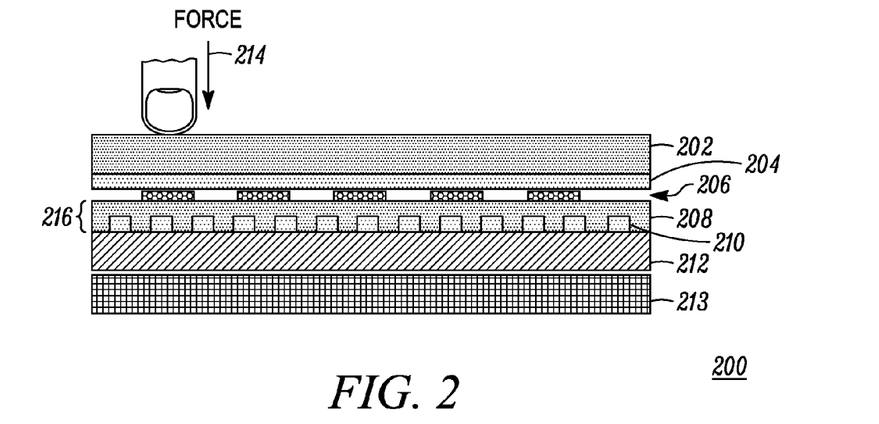
FIG. 2 is a side sectional view of a force sensing touch screen panel in accordance with some embodiments.

FIG. 2 is a side sectional view of a force sensing touch screen panel 200 in accordance with some embodiments. The force sensing touch screen panel 200 includes layers substantially as shown in FIG. 1, and includes a transparent cover layer 202, and upper position sensing layer 204, a force sensing layer 208, a lower position sensing layer 210, lower substrate/stiffener 212. A spacer layer 206 can be used to space the upper force sensing layer 204 from the force sensing layer 208. Information displayed on a graphical display 213 can be seen through the various layers. The transparent conductors of the upper position sensing layer 204 run laterally (across the page) and are orthogonally oriented relative to the transparent conductors of the lower position sensing layer 210, which run in and out of the page.

The force sensing layer 208 has a thickness 216 that can be reduced (compressed) by the application of a downward force 214, such as results when a user presses downward on the force sensing touch screen panel 200. Other means can be used to apply the downward force, such as, for example, a stylus. Then the force 214 is applied, the thickness 216 decreases. The point where the force 214 is applied will correspond to an intersection of an upper transparent conductor in the upper position sensing layer 204 and a lower transparent conductor of the lower position sensing layer 210. When the thickness 216 decreases, the electrical resistance between the upper transparent conductor and the lower transparent conductor is reduced. The amount of change in electrical resistance of the force sensing layer 208 due to the force 214 will depend on several factors, including the spring constant of the transparent cover layer 202, the thickness of the force sensing layer 208, and the conductive composition density of the force sensing layer 208, as well as the amount of force 214 applied. Since these factors can all vary in production, it is desirable to reduce, if not eliminate their effect so that there is consistent operation from unit to unit with regard to the amount of force 214 needed to produce similar input results from unit to unit, despite these production tolerance variations. The reduction in electrical resistance can be detected by conventionally sensing the total resistance between each upper transparent conductor and each lower transparent conductor. A threshold reduction in resistance between one upper transparent conductor and one lower transparent conductor therefore indicates the position of the force being applied to the force sensing touch screen panel 200 and can trigger a force sensing procedure.

Figure 3:
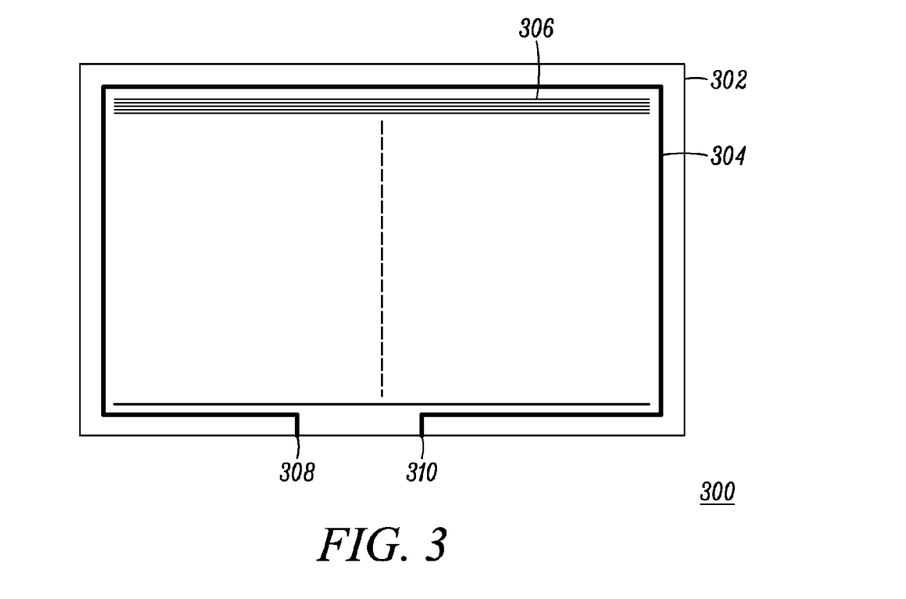
FIG. 3 is a plan view of a position sensing layer of a force sensing touch screen panel in accordance with some embodiments.

FIG. 3 is a plan view of a position sensing layer 300 of a force sensing touch screen panel in accordance with some embodiments. The position sensing layer can be either the upper or lower position sensing layers, and include transparent conductors 306 disposed on a substrate 302, and a calibration trace 304 that is formed by the same process used to form the transparent conductors 306 used for position sensing. The calibration trace 304 will have a thickness equivalent to that of the transparent conductors 306 of the position sensing layer since it is made by the same process. Therefore, the electrical resistance between terminals 308 and 310 will vary in correspondence with the thickness of the calibration trace 304, as will the transparent conductors 306 used for position sensing. The length and width of the calibration trace 304, like those dimensions of transparent conductors 306, can be controlled and therefore the variance in those dimensions has much less effect on the resistance from one point to another along the calibration trace 304 or the transparent conductor traces. Measuring resistance between terminals 308 and 310, and comparing the actual resistance of the calibration trace 304 to a pre-determined nominal calibration trace resistance provides a calibration factor that can therefore be applied to resistance determination of the transparent conductors 306. For example, a simple ratio of actual resistance over nominal resistance indicates the amount of variation in resistance due to variation in thickness of the calibration trace 304 and transparent conductors 306. The nominal total resistance, from one end to the other, of the transparent conductors 306 is known, therefore the actual total resistance of the transparent conductors can be determined by applying the calibration factor to that nominal resistance for the transparent conductors 306. A partial resistance, such as at a point along a transparent conductor 306 where force is applied, can therefore be determined by scaling the total nominal resistance of the transparent conductors by position and by the calibration factor determined from the calibration trace 304. In some embodiments it is contemplated that one or more of the transparent conductors 306 can be used as a calibration trace.

Figure 4:
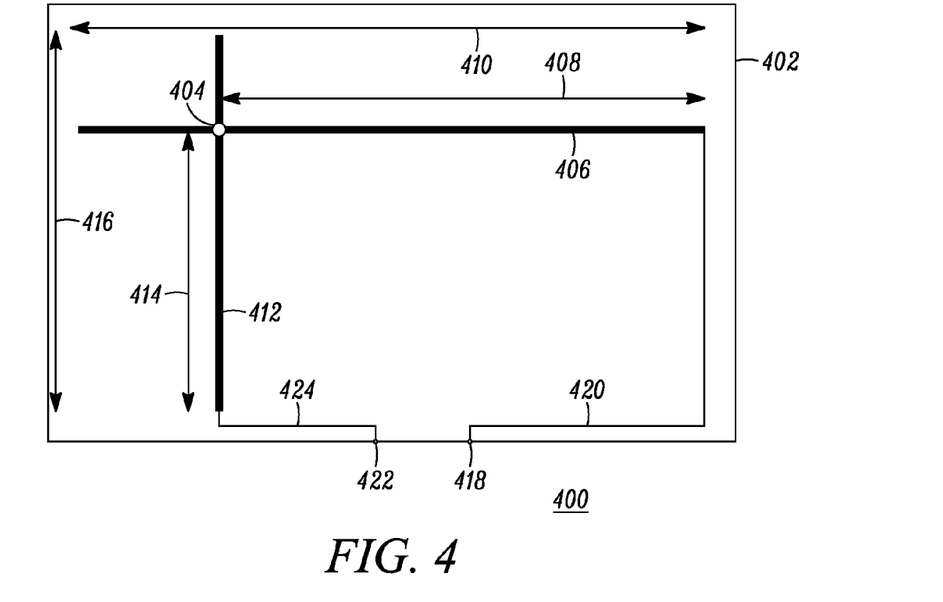
FIG. 4 is a plan view of a position sensing layer of a force sensing touch screen panel in accordance with some embodiments.

FIG. 4 is a plan view of position sensing layers 400 of a force sensing touch screen panel 402 in accordance with some embodiments. Specifically, a transparent conductor from both upper and lower position sensing layers are shown in overlay. A force 404 is applied at an intersection of a first transparent conductor 406 and a second transparent conductor 412. The first transparent conductor 406 can be on the upper position sensing layer and the second transparent conductor 412 can be on the lower position sensing layer of the touch screen panel 402. At the point where force 404 is applied, the force sensing layer between the first transparent conductor 406 and the second transparent conductor 412 is compressed, thereby reducing the resistance between them. A total resistance can be measured between terminals 418 and 422 that includes a partial resistance of the first transparent conductor 406 and a partial resistance of the second transparent conductor 412, and the resistance of the force sensing layer between the first and second transparent conductors 406, 412. The first terminal 418 is connected to the first transparent conductor 406 using a highly conductive runner 420, such as a silver conductive trace, which has a negligible electrical resistance. The second terminal 422 is connected to the second transparent conductor 412 using a second runner 424 that is also high conductive and has a negligible resistance. In practice, the first transparent conductor 406 is just one of a plurality of identical transparent conductor on the upper position sensing layer, each being connected to a terminal such as first terminal 418 by a conductive trace such as trace 420. Likewise, the second transparent conductor 412 is one of a plurality of identical transparent conductors on the lower position sensing layer, each connected to a terminal such as terminal 422 by a trace such as trace 424.

The first transparent conductor 406 has a total length 410 and a nominal resistance along the entire length is known. The partial resistance along partial length 408 can be determined by multiplying the ratio of the partial length 408 to the total length 410 by total nominal resistance and by the calibration factor for the upper position sensing layer determined using the calibration trace (i.e. 304 of FIG. 3). The partial length 408 is known because the resistance at terminal 422 can be detected as being below a threshold level, indicating a force is applied at the location of the second transparent conductor 412, whose position along the first transparent conductor 406 is known. Likewise, the partial resistance component provided by the second transparent conductor 412 along partial length 414 can be determined by knowing the nominal resistance for a total length 416 and the position of the first transparent conductor 406 along the total length 416 of the second transparent conductor 412, and determining the ratio and applying the calibration factor for the lower position sensing layer. Thus, the total resistance between terminals 418, 422 is sum of the partial resistance component of the first transparent conductor 406 along partial length 408, the partial resistance component of the second transparent conductor 412 along partial length 414, and the resistance of the force sensing layer at the intersection of the first and second transparent conductor 406, 412 where the force 404 is applied.

Figure 5:
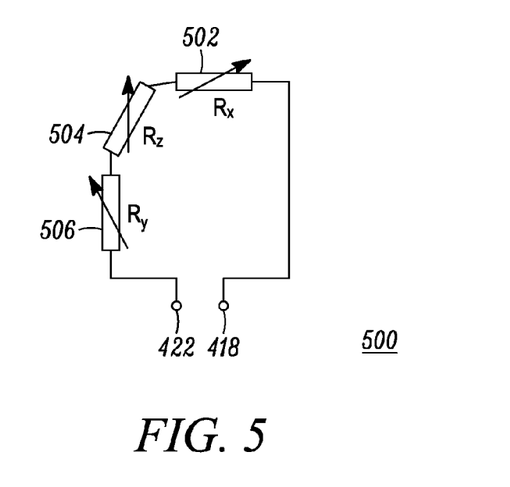
FIG. 5 is a resistance diagram of the resistance formed at a position on a force sensing touch screen panel in accordance with some embodiments.

FIG. 5 is a resistance diagram 500 of the resistance formed at a position on a force sensing touch screen panel in accordance with some embodiments. The resistance diagram models the total resistance between terminals 418, 422 of FIG. 4. A first partial resistance 502 $R_x$ can be the partial resistance component of the first transparent conductor 406 along partial length 408, which is oriented in the "x" (horizontal) direction along the page. A second partial resistance 506 $R_y$ can be the partial resistance component of the second transparent conductor 412 along partial length 414, which is oriented in the "y" (vertical) direction along the page. A third partial resistance 504 $R_z$ can be the partial resistance component of the force sensing layer, which varies with the amount of force being applied, among other factors. By determining the first partial resistance 502 and the second partial resistance 506 and subtracting them from the total resistance between terminals 418, 422, the third partial resistance 504 can be determined, and used to determine the magnitude of the force 404 being applied by mapping the third partial resistance 504 to a force value using a force sensing resistance to force curve.

Figure 6:
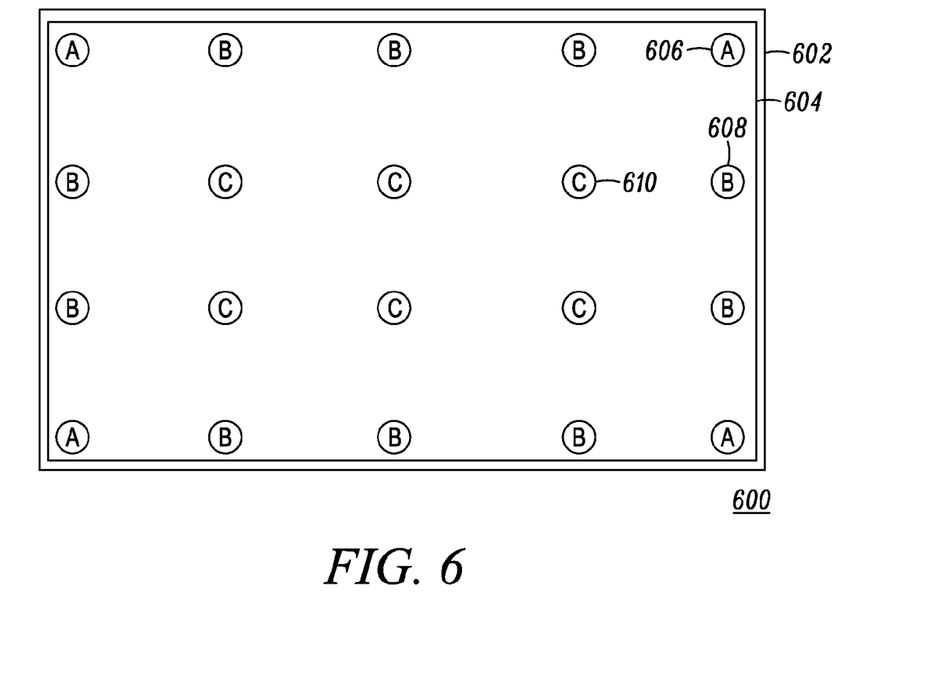
FIG. 6 is a plan view of a force calibration template for use in calibrating a force sensing touch screen panel in accordance with some embodiments.

FIG. 6 is a plan view 600 of a force calibration template 604 for use in calibrating a force sensing touch screen panel 602 in accordance with some embodiments. In order to determine the force being applied to the touch screen panel 602, the response to force of the touch screen panel 602 has to be characterized to allow mapping the resistance of the force sensing layer (i.e. the third partial resistance 504) to a force value. The characterization of the response takes several factors into account, including the effective spring effect or spring constant of the transparent cover layer, the thickness of the force sensing layer, and the electrical resistivity of the force sensing layer material itself which is a further factor of the density of conductive particles in the force sensing layer material. The characterization is produced by applying a force in increments and measuring the resistance of the force sensing layer for each force increment, and generating a graph or curve of electrical resistance as a function of applied force. Some of these factors, particularly the resilience of the transparent cover layer, change with location on the touch screen panel 602 due proximity to an edge or corner of the touch screen panel 602. Accordingly, in some embodiments, different resistance to force curves can be generated corresponding to different types of locations on the touch screen panel. For example, a curve for corner locations 606 can be generated by applying force in increments at a corner location 606 and measuring the electrical resistance of the force sensing layer under the point where force is applied for each increment of force. Likewise, the same can be performed for an edge location 608 and a center location 610. When a force is then detected during operation of the touch screen panel 602, a curve corresponding to the location of the force, meaning a corner, edge, or center location, can be used to determine the force applied based on the resistance of the force sensing layer where the force is detected. In some embodiments locations between a center location 610 and an edge location 608 can use curves for both locations and interpolate between them. The curves used in a particular device using the touch screen panel 602 can be nominal curves, determined from an average produced from a sample of several touch screen panels, or they can be the actual curve for that particular touch screen panel 602.

Figure 7:
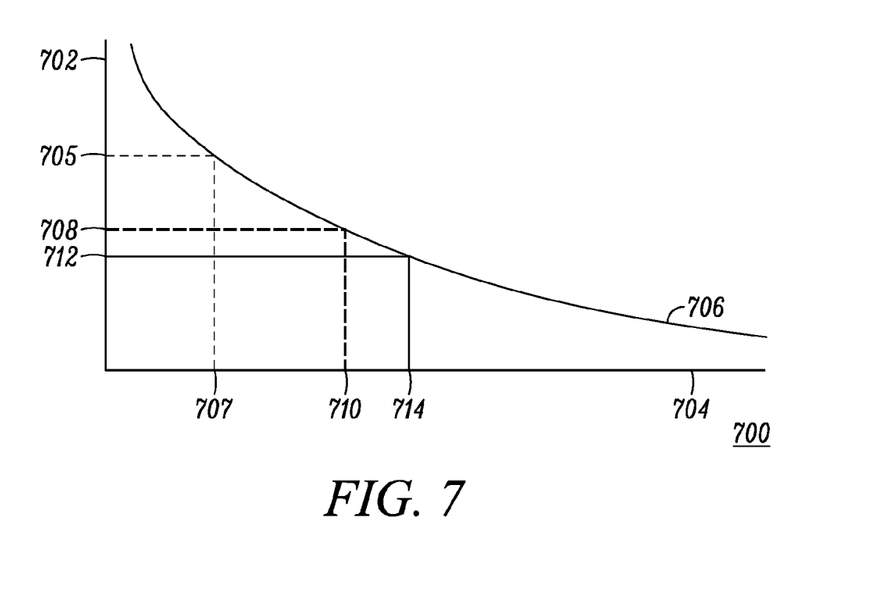
FIG. 7 is a curve of resistance in a force sensing layer versus force applied in a force sensing touch screen panel in accordance with some embodiments.

FIG. 7 is a graph chart 700 of a curve 706 of resistance in a force sensing layer as a function of force applied in a force sensing touch screen panel in accordance with some embodiments. The curve 706 can be generated, for example, in accordance with that described in reference to FIG. 6. The vertical axis 702 graphs electrical resistance of the force sensing layer between a transparent conductor of the upper position sensing layer and a transparent conductor of the lower position sensing layer that intersect where the force is applied, with the resistance value increasing upwards. The horizontal axis 704 graphs force, typically in grams, increasing from left to right. The curve 706 can be a nominal curve produced by sampling resistance as a function of force applied, or it can be specific to a particular touch screen panel. Furthermore, although shown here as a continuous curve, the curve 706 can be generated by using discrete force increments of, for example, 5 grams per increment, yielding corresponding discrete resistance values. Interpolation can be used for values falling between the graphed increments. Thus, the curve 706 can be stored in some embodiments as a table of force value increments and corresponding resistance values. In some embodiments a curve fitting equation can be generated and used to determine force as a function of resistance of the force sensing layer at the point where force is applied.

In determining the force being applied to the touch screen panel, in addition to having the curve 706 determined, the upper and lower calibration factors for the upper and lower position sensing layers are also determined. As an example, referring to FIGS. 4 and 7, assume a force 404 is applied to the touch screen panel 402. Furthermore, assume that the upper calibration factor for the upper position sensing layer has been determined to be 1.25, and the lower calibration factor for the lower position sensing layer is 1.16. Furthermore, assume that the length 410 of the first transparent conductor 406 is 150 millimeters (mm) and has a total nominal resistance of 12.4 kOhms, and the length 416 of the second transparent conductor 412 is 100 mm and has a total nominal resistance of 14.5 kOhms. A total resistance can be determined between terminals 418, 422 which includes, as shown in FIG. 5, a partial resistance component of the first transparent conductor 406 along length 408, a partial resistance component of the second transparent conductor 412 along length 414, and a partial resistance component of the force sensing layer at the point of the force 404 between the upper and lower position sensing layers.

Assume the total resistance detected is 132.3 kOhms between terminals 418, 422. In prior art embodiments the total resistance is simply used to map to a force. Thus, assume that 132.3 kOhms is at point 705 on graph 700. Using the curve 706, 132.3 kOhms maps to a force value at 707. However, this includes the resistance components of the upper and lower position sensing layers.

A closer approximate resistance of the force sensing layer can be determined by subtracting the partial resistance components of the first and second transparent conductors 406, 412. The nominal resistance component of the first transparent conductor can be determined as (110/150)*12.4 kOhms, which is approximately 9.1 kOhms. The nominal resistance component of the second transparent conductor is (65/100)*14.5 kOhms, which is approximately 9.4 kOhms. Thus, the nominal resistance of the force sensing layer is the total resistance minus the sum of the first and second resistance components, which in the present example is 132.3 kOhms–(9.1 kOhms+9.4 kOhms), which approximately 113.8 kOhms. A resistance of 113.8 kOhms is at point 708 of graph 700, which maps to a force value 710 using curve 706. However, while this is more accurate, it still neglects the upper and lower calibration factors.

Using the upper calibration factor given above as 1.25, a corrected resistance value for the partial upper resistance component can be determined as 1.25*9.1 kOhms, which is approximately 11.4 kOhms. Using the lower calibration factor given above as 1.16, a corrected resistance value for the partial lower resistance component can be determined as 1.16*9.4 kOhms, which is approximately 10.9 kOhms. Thus, the force sensing resistance is determined as the total resistance minus the sum of the corrected upper and lower partial resistance components: 132.3 kOhms–(11.4 kOhms+ 10.9 kOhms), which is approximately 110 kOhms. On graph 700 110 kOhms is at point 712, which corresponds to a force value at point 714. It will be appreciated by those skilled in the art that an alternative method of determining the resistance component of either first or second transparent conductors 406, 412 is to multiply the partial length (e.g. 408, 414) by a nominal resistance per unit length, based on the width of the transparent conductor.

Figure 8:
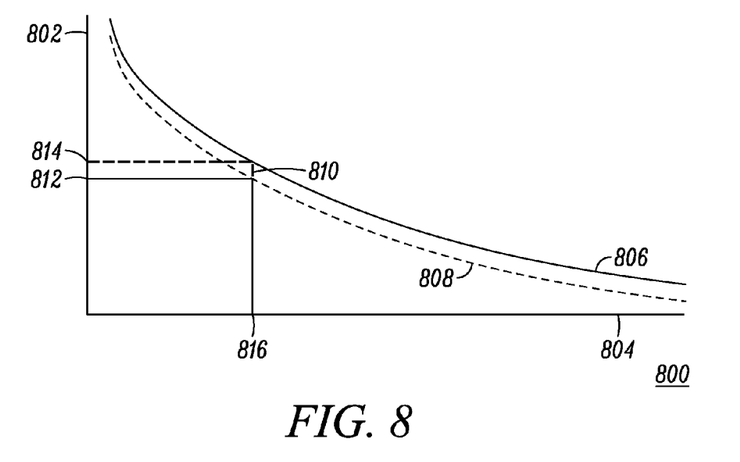
FIG. 8 is a graph showing calibration of a curve of resistance in a force sensing layer versus force applied in a force sensing touch screen panel in accordance with some embodiments.

FIG. 8 is a graph 800 showing calibration of a curve of resistance in a force sensing layer versus force applied in a force sensing touch screen panel in accordance with some embodiments. As in graph 700, the vertical axis 802 graphs electrical resistance of the force sensing layer between a transparent conductor of the upper position sensing layer and a transparent conductor of the lower position sensing layer that intersect where the force is applied, with the resistance value increasing upwards. The horizontal axis 804 graphs force, typically in grams, increasing from left to right. In addition to calibrating the resistance of the upper and lower position sensing layers, the curve relating the force sensing layer resistance to force applied can also be similarly calibrated. A nominal curve 806 can be generated by sampling and averaging the relationship of force sensing layer resistance and applied force for several touch screen panels, as previously described. To calibrate the curve, a known force is applied to the touch screen panel. Using the nominal curve 806 a resistance value at 814 should result. However, as an example, the actual measured resistance has a value at 812, which is a difference 810 from the nominal curve. Accordingly, the nominal curve can be shifted by the difference 810 to result in a calibrated curve 808 for the particular touch screen panel. In some embodiments where even more precision is desired, the actual curves can be generated for each touch screen panel. That is, rather than using a nominal curve (e.g. 706, 806) or a calibrated curve (e.g. 808), the actual relationship between force applied and resulting force sensing layer resistance can be determined for the touch screen panel.

Figure 9:
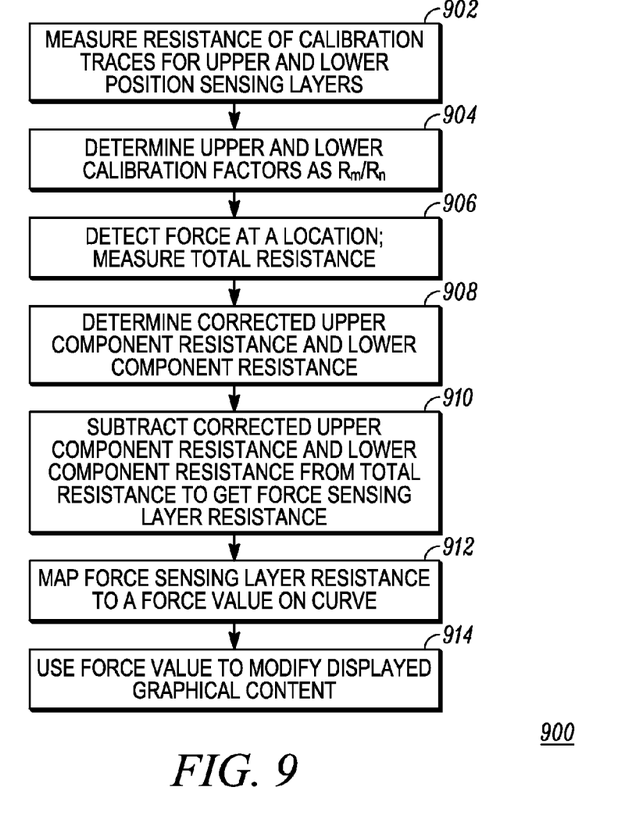
FIG. 9 is a flow chart diagram of a method of calibrating force sensing in a force sensing touch screen panel in accordance with some embodiments.

FIG. 9 is a flow chart diagram of a method 900 of calibrating force sensing in a force sensing touch screen panel in accordance with some embodiments. The method commences in step 902 where the resistance of the calibration traces for the upper and lower position sensing layers is measured. In step 904 the upper and lower calibration factors are determined, such as by a ratio of the actual measured resistance of the calibration traces, $R_m$, to a pre-determined nominal resistance, $R_n$. The determination of the calibration factors can be performed at the time of manufacture, and the calibration factors can be programmed into the device using the touch screen panel, or into a driver memory associated with the touch screen panel. In some embodiments the device using the touch screen panel can access the upper and lower calibration traces and determine the calibration factors. In step 906, a device using the touch screen panel can detect a force being applied to the touch screen panel, and based on the transparent conductors on the upper and lower position sensing layers that indicated a force is present, determine the location of the force. The device can also determine the total resistance through the point where force is applied. In step 908 the method 900 can determine the corrected upper component resistance and lower component resistance by applying the respective correction factors to the nominal value of the resistance for those respective segments of the transparent conductors, and based on the location of the detected force. In step 910, the corrected upper and lower component resistances are subtracted from the total resistance to determine the resistance of the force sensing layer at the force location between the upper and lower position sensing layers. In step 912 the force sensing layer resistance determined in step 910 can be mapped to a force value using a curve of force sensing resistance as a function of applied force. The curve can be a nominal curve used by touch screen panels generally, or a calibrated curve that is shifted based on a measurement of force sensing layer resistance in response to a known force for the particular touch screen panel, or the curve can be the actual curve of the particular touch screen panel produced by applying force in increments and measuring the actual resistance of the force sensing layer. Furthermore the curve can be one selected for the particular location of the force, such as a center location, an edge location, or a corner location, or an interpolation between curves for two different location types. In step 914 the device using the touch screen panel, upon determining the force value (i.e. the amount of force being applied by the user of the device), the device can modify displayed content in correspondence with the force value.

Figure 10:
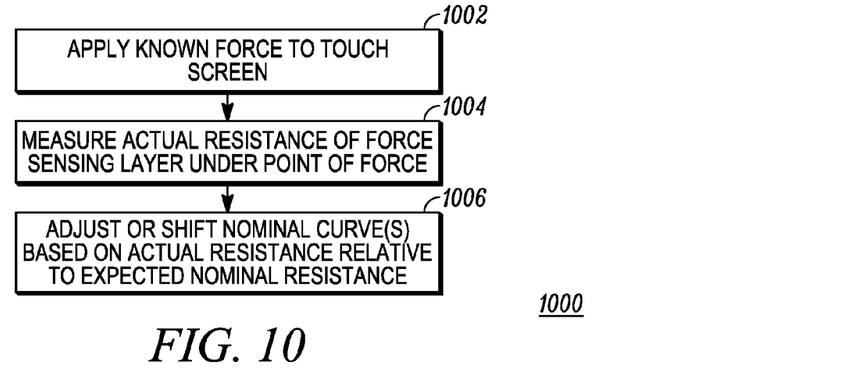
FIG. 10 is a flow chart diagram of a method of calibrating a curve of resistance in a force sensing layer versus force applied in a force sensing touch screen panel in accordance with some embodiments.

FIG. 10 is a flow chart diagram of a method 1000 of calibrating a curve of resistance in a force sensing layer versus force applied in a force sensing touch screen panel in accordance with some embodiments. The method 1000 describes some embodiments of the method of FIG. 8. The method 1000 assumes that a nominal curve (e.g. a graph of force sensing layer resistance as a function of applied force) has been previously produced. On step 1002 a known force is then applied to the touch screen panel. As a result, at the location of the force, the force sensing layer material will be compressed, reducing the electrical resistance in a direction from the upper position sensing layer to the lower position sensing layer. The actual electrical resistance of the force sensing layer at the point where the known force is applied is measured in step 1004. In step 1006 a calibrated curve can be produced by shifting the nominal curve based on the actual resistance measurement for the known force relative to the expected nominal resistance (e.g. the different 810 of FIG. 8).

Figure 11:
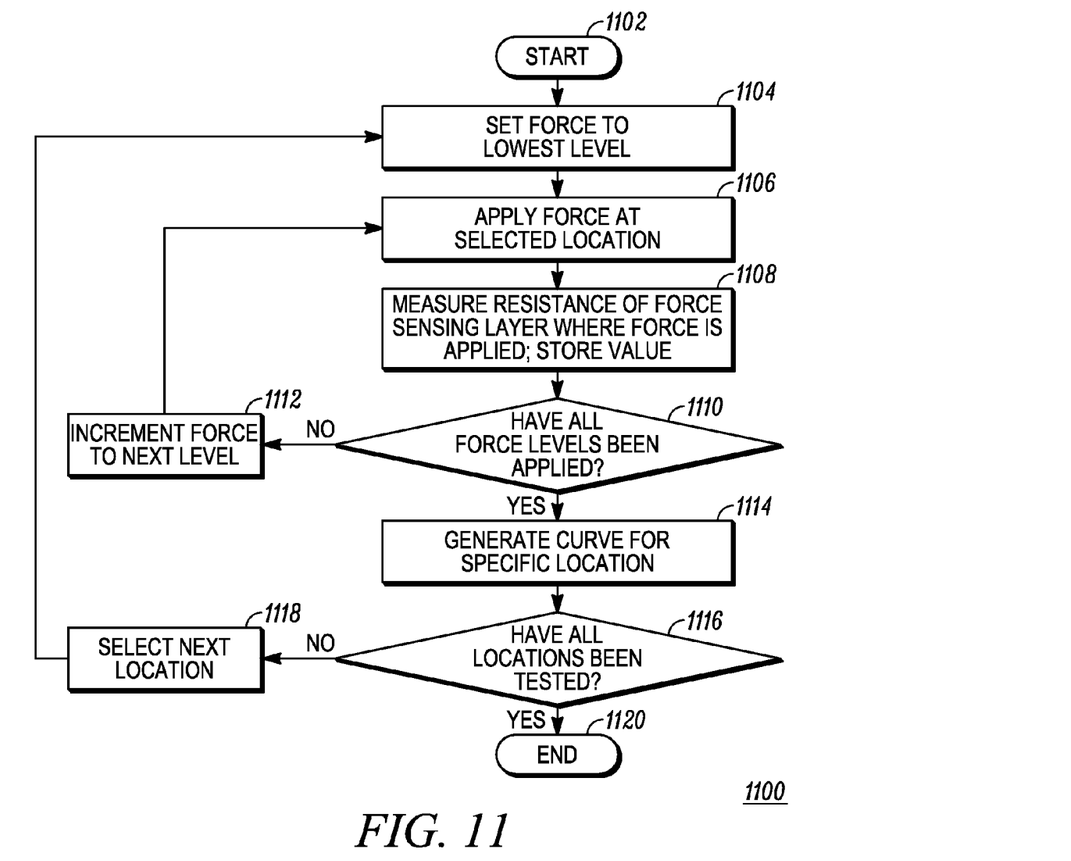
FIG. 11 is a flow chart diagram of a method of measuring actual resistance of a force sensing layer of a force sensing touch screen panel in accordance with some embodiments.

FIG. 11 is a flow chart diagram of a method 1100 of measuring actual resistance of a force sensing layer of a force sensing touch screen panel in accordance with some embodiments. At the start 1102 a touch screen panel is selected for force to resistance characterization. The method can commence in step 1104 by setting the force at a lowest level, which can be a threshold force required for touch to be detected on the touch screen panel. In step 1106 the selected force is applied at a selected location on the touch screen panel. In step 1108 the electrical resistance of the force sensing layer where the force is applied is then measured, and the resistance value can be stored. In step 1130 the method 1100 determines whether all increments of force have been tested. If not, then in step 1112 the force is incremented (e.g. by 5 grams) and the method 1100 returns to step 1106. If in step 1110 all increments of force have been tested, then in step 1114 a curve can be generated for the selected location of the touch screen panel being tested. The curve can be stored, for example, as a table that relates force to measured electrical resistance. Values stored in the table can be used for interpolation when, in use, a detected value falls between those in the table. In some embodiments curve fitting equations can be generated that sufficiently approximate the curve indicated by the measured and tested values. The curve can be stored in a device using the specific touch screen panel being tested. In step 1116 the method 1100 determines whether all locations being tested have been tested. If not, then the method 1100 proceeds to step 1118 where the next location is selected and the apparatus providing the force can be moved or the touch screen panel being tested can be moved in the test fixture, and the method 1100 loops back to step 1104 to repeat steps 1106, 1108, 1110, 1112, and 1114 for the new location. If all locations to be tested have been tested, then the method ends 1120. Those skilled in the art will appreciated that the method 1100 can also be used to generate a nominal curve by performing the method 1100 for several different touch screen panels, and averaging the resulting values for similar force increments at similar locations.

Figure 12:
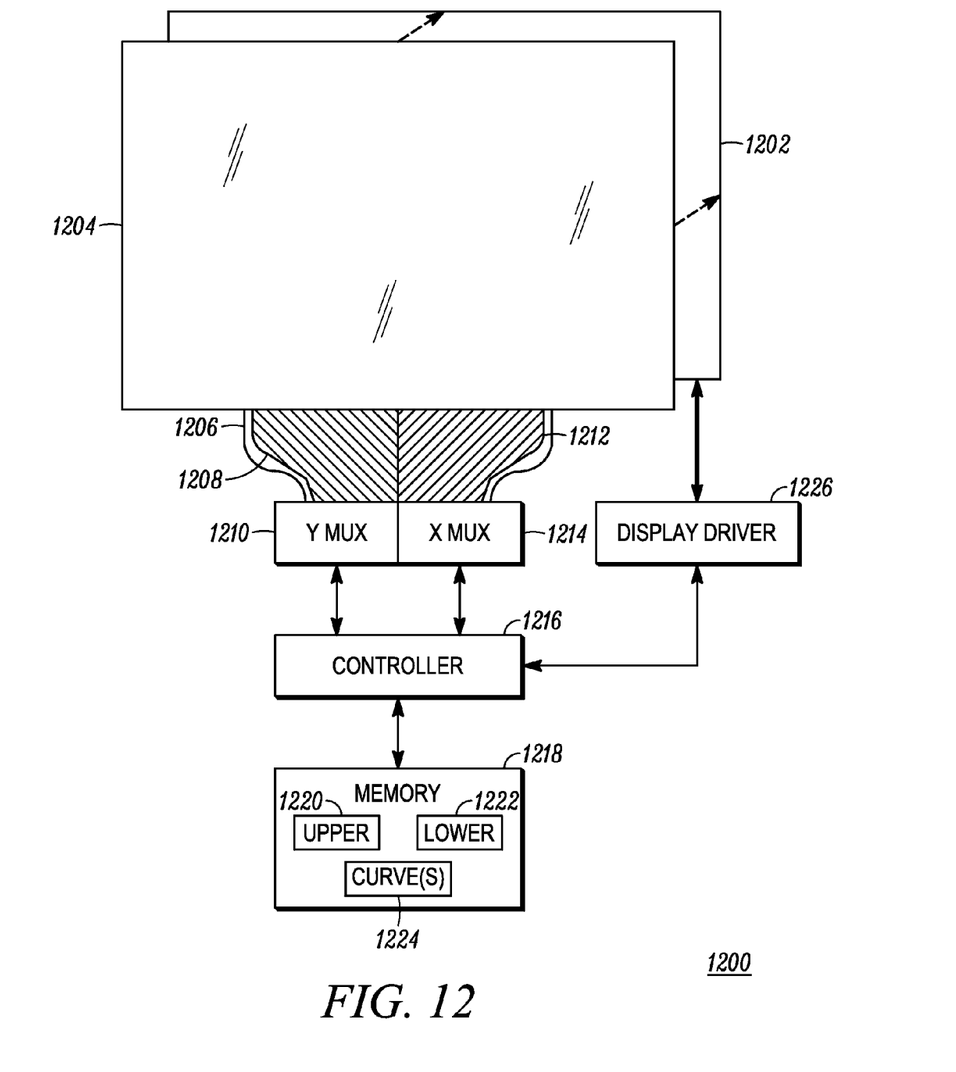
FIG. 12 is a block diagram of a device using a force sensing touch screen panel in accordance with some embodiments.

FIG. 12 is a block diagram of a device 1200 using a force sensing touch screen panel 1204 in accordance with some embodiments. The touch screen panel 1204 can be a force sensing touch screen panel such as that shown in FIG. 1, and is show (offset) over a graphical display 1202. The touch screen panel 1204 is transparent, so that the graphical display 1202 can be seen through the touch screen panel 1204. The touch screen panel comprises two position sensing layers of orthogonally oriented transparent conductors, which can be an upper position sensing layer and a lower position sensing layer. The transparent conductors of the upper position sensing layer can be oriented horizontally, in the "x" orientation, and the transparent conductors of the lower position sensing layer can be oriented vertically, in the "y" orientation. The touch screen panel can be scanned by, for example, selecting one transparent conductor of the upper position sensing layer, applying a voltage, and then sensing each transparent conductor of the lower position sensing layer sequentially to determine whether there is an indication of touch at any of the intersections. The scanning is repeated for each transparent conductor in the upper position sensing layer sequentially. Accordingly, a connector 1206 is required to connect to each transparent conductor that have conductive traces corresponding to each transparent conductor. A first set of conductive traces 1208 can connect to the transparent conductors on the lower position sensing layer, and a second set of conductive traces 1212 can connect to the transparent conductors of the upper position sensing layer. The sets of conductive traces 1208, 1212 can be disposed in a flexible circuit board. The first set of conductive traces 1208 can be coupled to a first multiplexer 1210 ("Y MUX") and the second set of conductive traces 1212 can be connected to a second multiplexer 1214 ("X MUX"). The multiplexers 1210, 1214 can select specific transparent conductor for sensing operations. The multiplexers 1210, 1214 can be controlled by a controller 1216 which can include control circuitry, logic circuits, and a microcontroller or microprocessor for operating the device 1200. The controller 1216 can be coupled to memory 1218 that can include read only memory (ROM), random access memory (RAM), non-volatile programmable memory, and so on. The memory 1218 can be used to instantiate applications, including a force sensing application for sensing force applied to the touch screen panel 1204. The memory has stored therein an upper calibration factor 1220, a lower calibration factor 1222, and at least one curve 1124 that relates force applied to resistance of the force sensing layer of the touch screen panel 1204. The upper calibration factor is used to calibrate or adjust a nominal resistance value for the transparent conductors of the upper position sensing layer and the lower calibration factor is used to similarly calibrate or adjust a nominal resistance value for the transparent conductors of the lower position sensing layer. When a force is applied to the touch screen panel 1204, the location of the force can be detected based on the selection settings of the multiplexers 1210, 1214. A total resistance through the selected transparent conductors and the force sensing layer between them can be measured, and resistance component of the force sensing layer can be determined as explained in regard to, for example, in FIGS. 4-5, adjusting the resistance components of the selected upper and lower transparent conductors using the calibrations factors 1220, 1222. The force applied can be determined by using the determined resistance value of the force sensing layer with a selected curve 1224. Once the force is determined, the controller 1216 can determine what effect the force value has on information displayed on the graphical display 1202, and provide changes to a display driver 1226 which controls operation of the graphical display 1202.

Accordingly, embodiments of the disclosure provide the benefit of improved force determination in a force sensing touch screen panel by characterizing variations in the resistance components used to determine the force being applied. This allows for more consistency in operation from unit to unit so that the amount of force used by a user to provide a desired input is substantially the same from one unit to the next, even though there can be substantial variations in the resistance of the components involved among units.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A method of calibrating a pressure metric for touch screen panel, comprising:
   measuring an electrical resistance of a upper calibration trace of an upper position sensing layer of the touch screen panel, and measuring an electrical resistance of a lower calibration trace of a lower position sensing layer of the touch screen panel;
   determining an upper calibration factor as a ratio of the measured electrical resistance of the upper calibration trace to a nominal upper resistance, and determining a lower calibration factor as a ratio of the measured electrical resistance of the lower calibration trace to a nominal lower resistance;
   determining a total resistance through a point at which a force is applied on the touch screen panel, the total resistance including an upper layer component, a lower layer component, and a force sensing layer component, wherein the force sensing layer component is a resistance of a compressible material between the upper and lower component layers;
   determining an electrical resistance of the force sensing layer component by subtracting a corrected upper layer component and a corrected lower layer component from the total resistance, wherein the corrected upper layer component and corrected lower layer components are produced by applying the upper calibration factor and lower calibration factor to the upper layer component and lower layer component, respectively; and
   determining the force applied on the touch screen panel by mapping the electrical resistance of the force sensing layer to the force applied on a curve of force sensing layer resistance over force.

2. The method of claim 1, wherein determining the force applied on the touch screen panel comprises selecting the curve from a plurality of curves, where each of the plurality of curves correspond to a different position on the touch screen panel, and wherein selecting the curve is based on a position of the force on the touch screen panel.

3. The method of claim 2, wherein selecting the curve comprises selecting one of a curve for a middle portion of the touch screen panel, a curve for an edge portion of the touch screen panel, or a curve for a corner portion of the touch screen panel.

4. The method of claim 1, wherein the curve is produced by measuring an actual electrical resistance of the force sensing layer responsive to a known force and adjusting a nominal curve of electrical resistance of the force sensing layer to the force applied by a calibration factor produced that is a ratio of the actual electrical resistance to a nominal electrical resistance indicated by the nominal curve for the known force.

5. The method of claim 1, wherein the curve is produced by determining an actual force sensing layer resistance to force for the touch screen panel.

6. The method of claim 1, wherein measuring the electrical resistance of the upper calibration trace and the lower calibration trace comprise measuring the electrical resistance of a loop trace around a perimeter of the upper position sensing layer and lower position sensing layer, respectively.

7. A method for determining force applied to a touch screen panel, comprising:
   determining a total resistance through a point at which a force is applied on the touch screen panel having an upper position sensing layer and a lower position sensing layer, the total resistance including an upper layer component, a lower layer component, and a force sensing layer component, wherein the force sensing layer component is a resistance of a compressible material between the upper and lower layers;
   determining an electrical resistance of the force sensing layer component by subtracting a corrected upper layer component and a corrected lower layer component from the total resistance, wherein the corrected upper layer component and corrected lower layer components are produced by applying a predetermined upper calibration factor and a predetermined lower calibration factor to the upper layer component and lower layer component, respectively; and
   determining the force applied on the touch screen panel by mapping the electrical resistance of the force sensing layer to the force applied on a curve of force sensing layer resistance over force.

8. The method of claim 7, wherein determining the force applied comprises selecting the curve from a plurality of curves, where each of the plurality of curves correspond to a different position on the touch screen panel, and wherein selecting the curve is based on a position of the force on the touch screen panel.

9. The method of claim 8, wherein selecting the curve comprises selecting one of a curve for a middle portion of the touch screen panel, a curve for an edge portion of the touch screen panel, or a curve for a corner portion of the touch screen panel.

10. The method of claim 7, wherein the curve is produced by measuring an actual electrical resistance of the force sensing layer responsive to a known force and adjusting a nominal curve of electrical resistance of the force sensing layer to the force applied by a calibration factor produced that is a ratio of the actual electrical resistance to a nominal electrical resistance indicated by the nominal curve for the known force.

11. The method of claim 7, wherein the curve is produced by determining an actual force sensing layer resistance to force for the touch screen panel.

12. The method of claim 7, wherein measuring the electrical resistance of the upper calibration trace and the lower calibration trace comprise measuring the electrical resistance of a loop trace around a perimeter of the upper position sensing layer and lower position sensing layer, respectively.

13. The method of claim 7, further comprising:
measuring an electrical resistance of a upper calibration trace of the upper position sensing layer of the touch screen panel, and measuring an electrical resistance of a lower calibration trace of the lower position sensing layer of the touch screen panel; and
determining the upper calibration factor as a ratio of the measured electrical resistance of the upper calibration trace to a nominal upper resistance, and determining the lower calibration factor as a ratio of the measured electrical resistance of the lower calibration trace to a nominal lower resistance.

14. The method of claim 7, further comprising adjusting information displayed on the touch screen in correspondence with the determined force.

15. A method of manufacturing force sensing touch screens, comprising:
providing an upper calibration trace on an upper position sensing layer of a touch screen panel;
providing a lower calibration trace on a lower position sensing layer of a touch screen panel;
measuring an electrical resistance of the upper calibration trace of the upper position sensing layer of the touch screen panel, and measuring an electrical resistance of a lower calibration trace of the lower position sensing layer of the touch screen panel;
determining the upper calibration factor as a ratio of the measured electrical resistance of the upper calibration trace to a nominal upper resistance, and determining the lower calibration factor as a ratio of the measured electrical resistance of the lower calibration trace to a nominal lower resistance; and
providing the upper calibration factor, the lower calibration factor, and at least one curve of force sensing layer resistance to a device using the touch screen panel, wherein the at least one curve of force sensing layer resistance relates force to resistance of a force sensing layer between the upper position sensing layer and the lower position sensing layer.

16. The method of claim 15, wherein providing the at least one curve of force sensing layer resistance comprises a curve for a corner portion, a curve for an edge portion, and a curve for a center portion.

17. The method of claim 15, wherein the at least one curve force sensing layer resistance is at least one nominal curve, the method further comprises:
measuring an actual electrical resistance of the force sensing layer responsive to a known force; and
determining a calibration factor that is a ratio of the actual electrical resistance to a nominal electrical resistance indicated by the nominal curve for the known force; and
providing the calibration factor to the device using the touch screen panel.

18. The method of claim 15, wherein providing the at least one curve of force sensing layer resistance comprises generating a curve for each of a corner, edge and center position of the touch screen panel by applying force in increments and measuring an actual resistance for each force increment.

19. The method of claim 15, wherein providing the upper calibration trace and providing the lower calibration trace comprises providing a loop trace around a perimeter of the upper position sensing layer and a loop trace around a perimeter of the lower position sensing layer, respectively;
wherein the loop traces are produced by a process used to produce transparent conductors on the upper and lower position sensing layers, and wherein the loop traces are comprised of the same material as the transparent conductors.

20. The method of claim 15, wherein providing the upper calibration trace and providing the lower calibration trace comprises providing a plurality of transparent conductors for position sensing on the upper and lower position sensing layers, wherein at least one transparent conductor on of the upper position sensing layer is used as the upper calibration trace, and at least one transparent conductor on of the lower position sensing layer is used as the lower calibration trace.

* * * * *